Jan. 29, 1957 C. A. GALLAGHER 2,779,894
AUTOMATIC BEAM-CENTERING CIRCUIT
FOR CATHODE-RAY DEVICES
Filed March 15, 1954
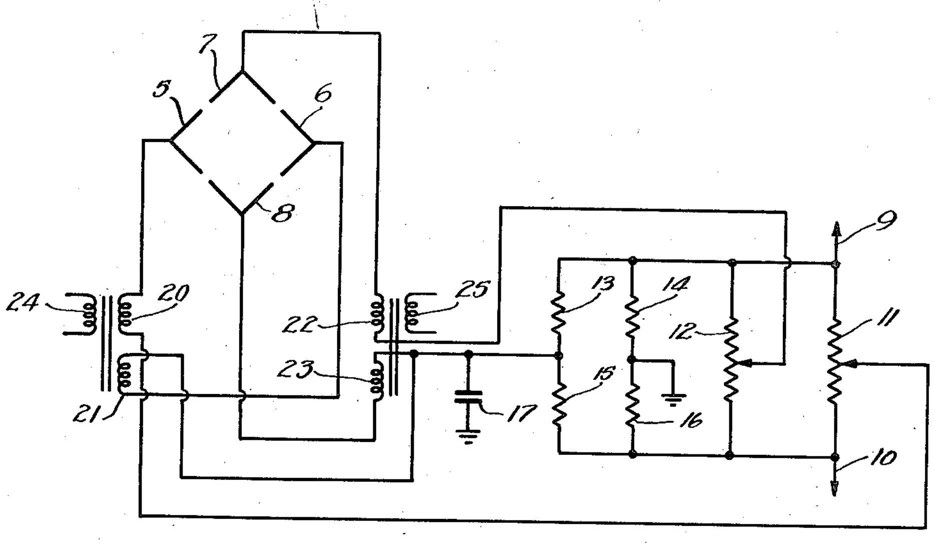
INVENTOR
CORNELIUS A. GALLAGHER
BY
Mitchell & Bechert
ATTORNEYS United States Patent Office 2,779,894

Patented Jan. 29, 1957

2,779,894

AUTOMATIC BEAM-CENTERING CIRCUIT FOR CATHODE-RAY DEVICES

Cornelius A. Gallagher, Hicksville, N. Y., assignor to Servo Corporation of America, New Hyde Park, N. Y., a corporation of New York Application March 15, 1954, Serial No. 416,079

8 Claims. (Cl. 315—24)

My invention relates to circuit means for maintaining beam centering in a cathode-ray tube under conditions of varying centering supply potentials.

It is an object of the invention to provide an improved circuit of the character indicated.

It is another object to provide a circuit in which beam centering will be effected automatically by relatively simple components, with improved inherent stability.

It is a further object to provide a centering circuit meeting the above objects and serving at one and the same time to stabilize the centering of a plurality of deflection circuits.

Other objects and various further features of novelty and invention will be pointed out or will occur to those skilled in the art from a reading of the following specification in conjunction with the accompanying drawing, which is a circuit diagram illustrating a preferred embodiment of the invention.

Briefly stated, my invention contemplates an improved beam-centering circuit, whereby one may avoid the need for the two dual potentiometers customarily employed. I achieve this result by employing a single bridge comprised of fixed resistors to maintain a constant difference of potential between deflection plates and by capacitatively interconnecting the unenergized corners of the bridge. The net result is a floating ground on one of the vertical and one of the horizontal deflection terminals, thereby maintaining the beam at its original position.

Referring to the drawing, my invention is shown in application to the centering control of a cathode-ray tube having two mutually perpendicular deflection systems in the form of a first pair of plates 5—6, each of which has its own independent input terminal. Beam-centering voltage is available from connections 9—10 to a source of direct current, which may be balanced with respect to ground. Potentiometer means 11—12 may also be connected across said source, thereby providing trimming connections for initial adjustment of centering voltages at one terminal (5—7) of each of the two deflection systems.

In accordance with the invention, automatic centering control is effected by means of a four-element bridge 13—14—15—16 having connections to the remaining terminals of the deflection systems. The bridge may be viewed as in reality two fixed resistances 13—15 and 14—16, connected in parallel to the source 9—10, and with capacitance means 17 interconnecting the unenergized bridge terminals, which happen to be at midpoints of the respective bridge legs 13—15 and 14—16. One unenergized corner of the bridge—that is, one connection to the capacitance 17—may be connected directly to both the remaining deflection terminals 6—8. In the form shown, the capacitance connection to the bridge is completed by grounding the midpoint of leg 14—16 and by grounding the capacitance 17.

To complete the circuit, I have indicated my preference for connecting signal windings to the respective deflection systems by employing like secondary-winding halves 20—21 for one deflection system and connected respectively in each of the lines to the terminals 5—6 for such deflection system. Similarly, like secondary-winding halves of another signal winding 22—23 may be connected in each of the lines to the other deflection system 7—8. A horizontal deflection winding 24 energizes windings 20—21 in common, and a vertical deflection winding 25 energizes windings 22—23 in common.

In use, adjustment should first be made at potentiometers 11—12 to assure the desired axis centering on the face of the tube, but once this adjustment has been made no further regulation is necessary even under conditions of varying center-supply potentials at 9—10. At low beam-current intensity, the voltages across resistors 14—16 will be equal, and of opposite polarity; since resistors 13—15 are equal and are connected in series across resistors 14—16, the voltage at the junction of these resistors (13—15) is zero, with respect to ground, and a balanced-bridge condition exists. With an increased intensity, the voltage across, say, resistor 16 will increase due to increased beam current, and the voltage across the conjugate resistor 14 will decrease, due to high-voltage supply regulation. Ordinarily, this change in voltage applied to the deflection system would cause the beam to change position. However, the junction point of resistors 13—15, which was previously at zero potential, now assumes a positive potential (bridge circuit now unbalanced), thus opposing the increased voltage across resistor 15 and effectively increasing the voltage across resistor 13. The net result is a floating ground on one of the vertical and on one of the horizontal terminals so as to produce a D. C. voltage opposing the instantaneous D. C. voltage change on the other associated deflection terminal, so that the beam will be held at its original position.

It will be seen that I have described a relatively simple circuit achieving automatic control of beam centering without the use of dual potentiometers and the reduced stability inherent therein. Greater stability and reduced cost result from the use of a bridge control employing fixed resistors. It happens that I have described my bridge 13—14—15—16 in conjunction with the automatic centering of a beam on two deflection axes, but clearly the same bridge could also simultaneously serve one deflection axis or more than two axes. The described circuit is particularly useful in equipment requiring prolonged beam centering, such as visual-display radio direction finders.

While I have described the invention in detail for the preferred form shown, it will be understood that modifications may be made within the scope of the invention as defined in the claims which follow.

I claim:

1. In combination, cathode-ray deflection means, comprising two deflection systems each having a pair of input terminals, and centering control means for said systems, comprising a direct-current supply, a four-element bridge connected at a first pair of diagonal corners to said source, means connecting a third corner of said bridge to one terminal of each of said deflection systems, a capacitative connection between the third and fourth corners of said bridge, and potentiometer means across said source and connected to the other terminal of each of said deflection systems.

2. The combination of claim 1, in which said potentiometer means comprises separate potentiometers separately connected across said supply and separately connected to each said other terminal of said deflection systems.

3. In combination, a cathode-ray deflection system having a pair of input terminals, and centering-control means for said system comprising a direct-current supply, a four-element bridge connected at a first pair of diagonal corners to said source, means connecting a third corner of said bridge to one terminal of said deflection system, a capacitative connection between said third and fourth corners, and a potentiometer across said source and connected to the other terminal of said deflection system, said connections to said deflection-system terminals being otherwise electrically independent.

4. In combination, cathode-ray deflection means comprising a deflection system having a pair of input terminals, three resistances in parallel and disposed for connection to a direct-current supply, means connecting the respective midpoints of two of said resistances across the said pair of input terminals, and a capacitative connection between the midpoint of one of said first resistances and the midpoint of the third of said resistances, said connections to said deflection-system terminals being otherwise electrically independent.

5. The combination of claim 4, in which the resistances interconnected by said capacitance are fixed resistances.

6. The combination according to claim 4, in which the resistance not connected to said capacitance is an adjustable center-tap potentiometer.

7. The combination of claim 4, in which the connections to said terminals include like independent halves of signal-winding means coupled in common to a single input winding.

8. The combination of claim 4, in which one of the connections to said capacitance is grounded.

References Cited in the file of this patent

UNITED STATES PATENTS

| | | |
|---|---|---|
| 2,297,949 | Farnsworth | Oct. 6, 1942 |
| 2,472,727 | Salinger | June 7, 1949 |
| 2,494,457 | Stolze | Jan. 10, 1950 |
| 2,575,477 | Weimer | Nov. 20, 1951 |